Dec. 4, 1923.  
F. R. McGEE ET AL  
1,476,344  
VALVE  
Filed May 12, 1921   5 Sheets-Sheet 1

Witnesses:
Edwin Trueb

Inventors:
FRANK R. McGEE and ARTHUR R. SCHULZE.
By: D. Anthony Usina
their Attorney.

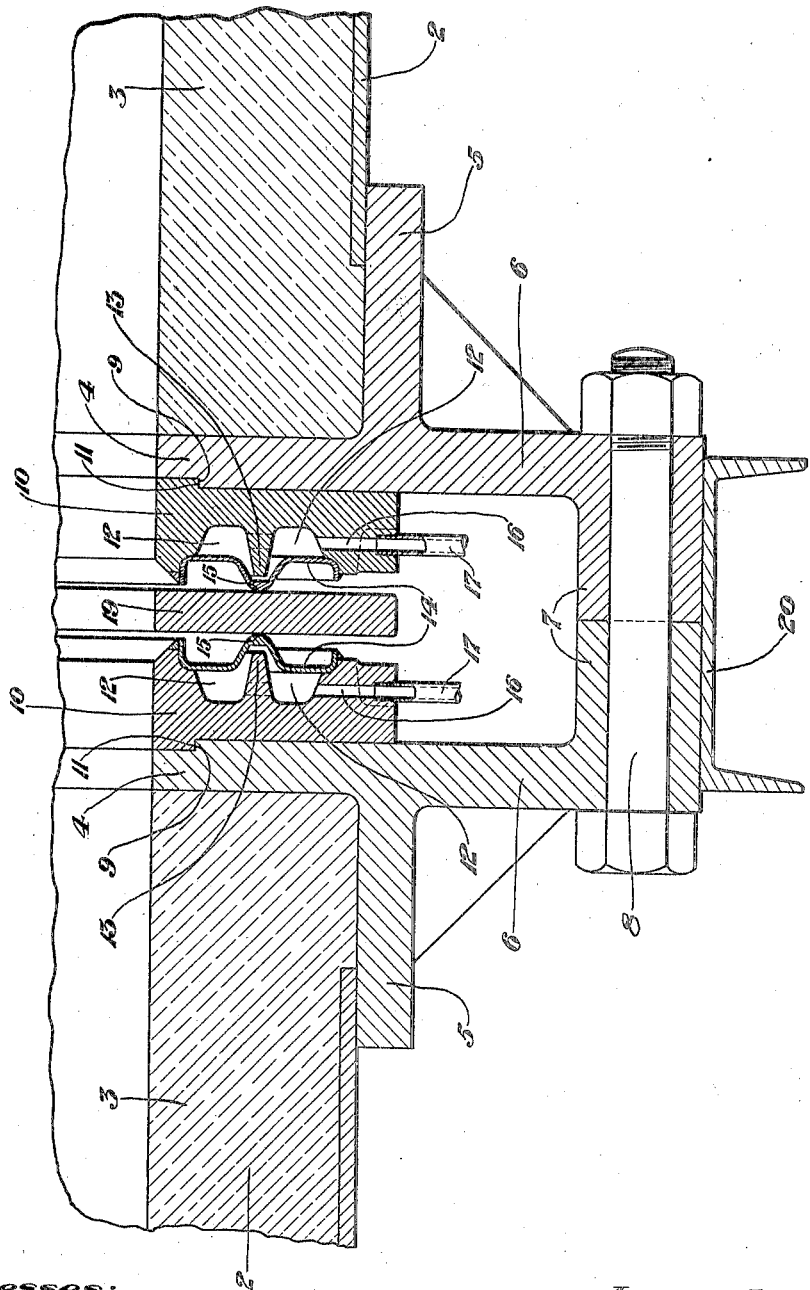

Dec. 4, 1923.

F. R. McGEE ET AL 1,476,344

VALVE

Filed May 12, 1921  5 Sheets-Sheet 5

Witnesses:
Edwin Trueb

Inventors:
FRANK R. McGEE and ARTHUR R. SCHULZE,
By D. Anthony Usina
their Attorney

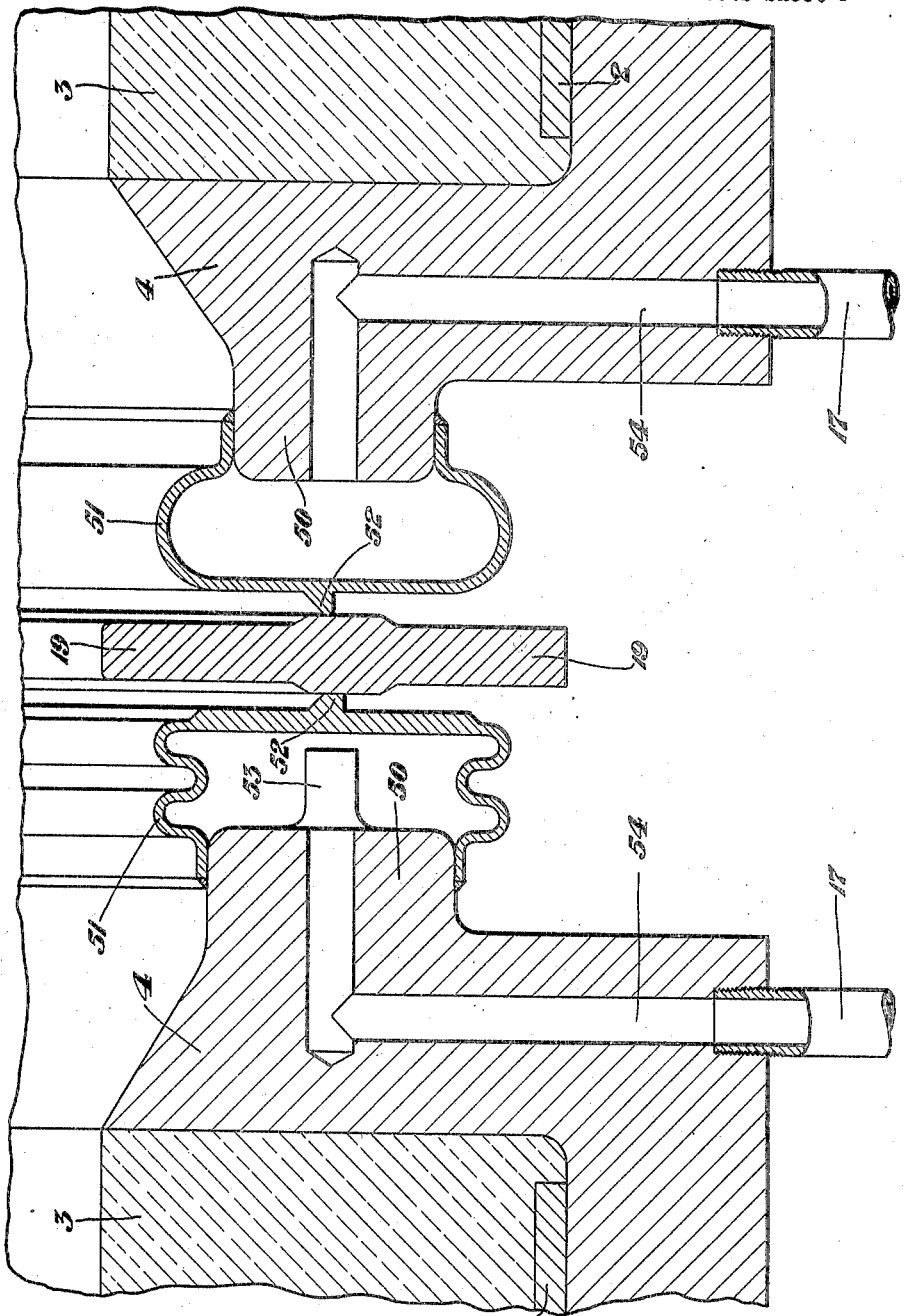

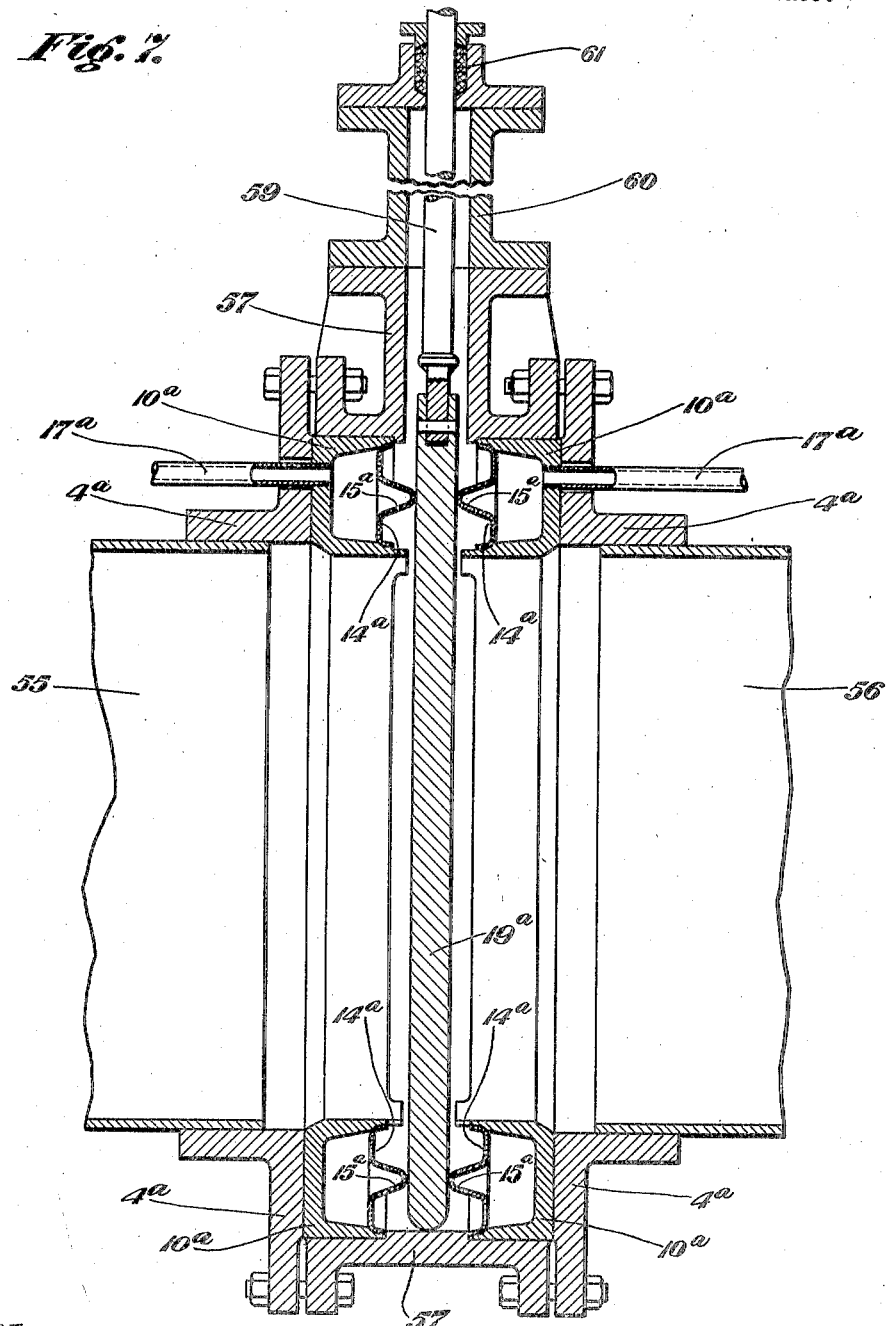

Patented Dec. 4, 1923.

1,476,344

UNITED STATES PATENT OFFICE.

FRANK R. McGEE AND ARTHUR R. SCHULZE, OF STEUBENVILLE, OHIO.

VALVE.

Application filed May 12, 1921. Serial No. 468,891.

*To all whom it may concern:*

Be it known that we, FRANK R. McGEE and ARTHUR R. SCHULZE, citizens of the United States, and residents of Steubenville, in the county of Jefferson and State of Ohio, have invented certain new and useful Improvements in Valves, of which the following is a specification.

Our invention relates to valves and while not limited thereto relates particularly to goggle and gate valves in which a sliding valve plate is manipulated to control the flow area of a main.

The principal object of our invention is to provide expansible seats adapted to be forced out against the valve plate and seal against the same.

Another object is to provide a valve having a balanced reciprocatory plate or gate which is easily opened and closed, having expansible valve seats and having novel means for forcing fluid under pressure into and withdrawing it from said valve seats whereby they are expanded and contracted.

A still further object of our invention is the provision of a valve having the novel constructions, arrangements and combinations of parts shown in the drawings, hereinafter described in detail, and particularly pointed out in the appended claims.

Referring now to the drawings, Figure 1 is a side elevation of a main or conduit having a goggle valve embodying our invention mounted therein and connected to suitable fluid pressure mechanism for expanding the valve seats.

Figure 3 is a fragmentary detail view showing the construction of the valve seat.

Figure 6 is an enlarged fragmentary detail view of modified forms of valve seats.

Figure 7 is a sectional elevation showing our invention applied to a gate valve.

Figure 2:
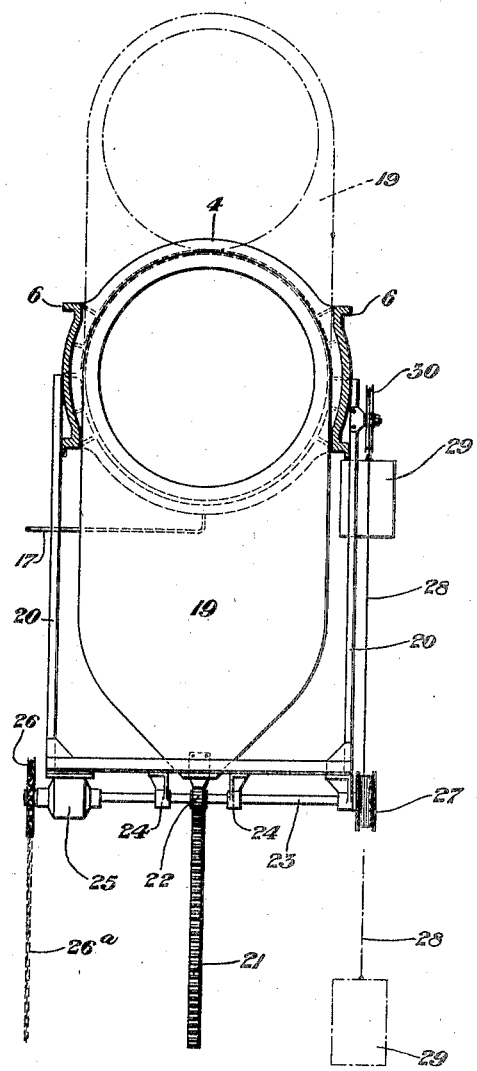
Figure 2 is a sectional elevation of the same.
Figure 1:
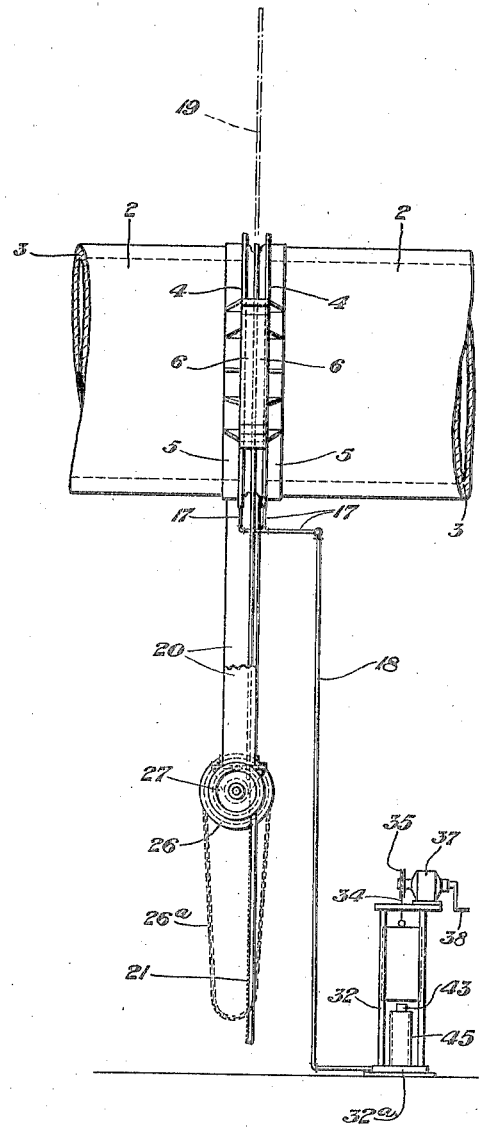
Figure 4:
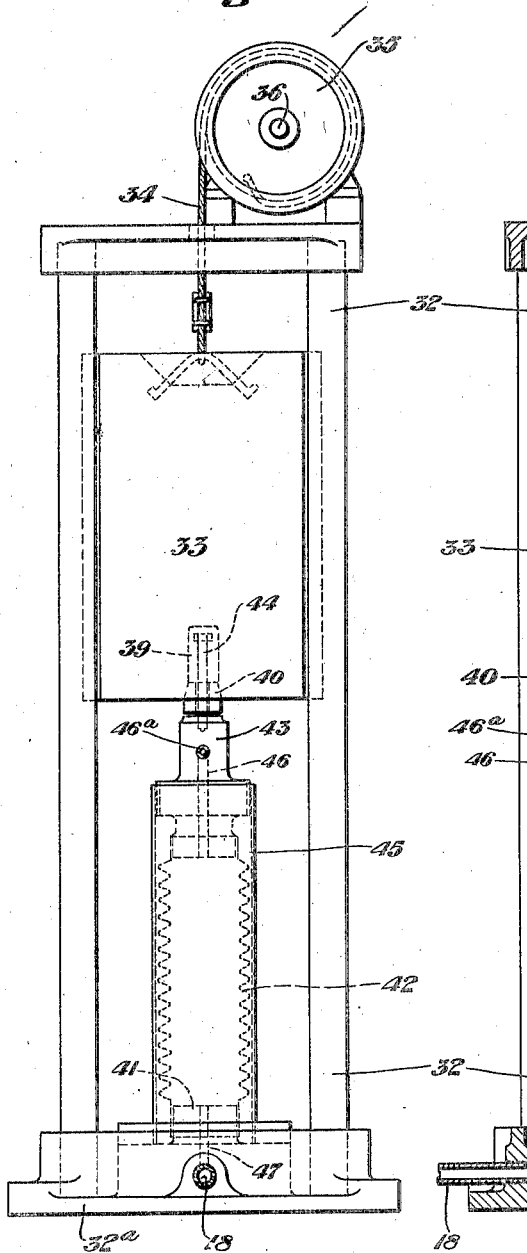
Figure 4 is a side elevation of the fluid pressure mechanism of Figure 1.
Figure 5:
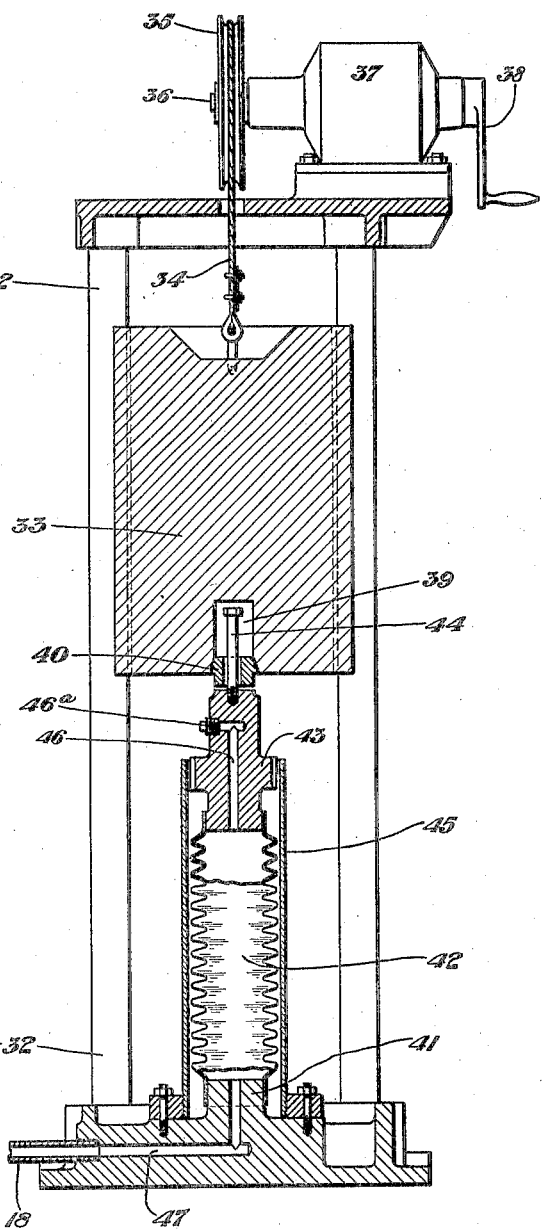
Figure 5 is a sectional elevation of the fluid pressure mechanism.

Referring more particularly to the drawings, the conduits or mains in which this valve is generally mounted are of a heavy type such as gas mains, exhaust mains, etc., and are composed of an outer metal shell 2 of metal having a brick or similar lining 3. At the point where the valve is to be located the main is divided, and a pair of rings 4 of sufficient width to extend over the wall of the main and having a securing flange 5 on their one side adjacent their outer periphery are secured in place by riveting or welding the flange 5 to the metal shell 2 of the main.

The rings 4 are extended at opposite points around their periphery forming wings 6 which are provided with hollow spacing lugs 7 which are adapted to aline when the rings are properly positioned and to have the securing bolts 8 passed therethrough to secure the rings together in spaced relation.

The inner faces of the rings 4 in the preferred construction are offset adjacent their inner periphery forming a shoulder 9, and pressure rings 10 are bolted or otherwise secured on the inner faces of the rings 4 and are provided with a projecting portion 11 adapted to fit into the offset portion of the rings 4 and abut the shoulder 9.

The free face of the pressure rings 10 is provided with a channel or groove 12 divided by a rib 13, and an expansion plate or seat 14 is mounted in the channel or groove 12 and secured to the side walls thereof by welding, brazing, or the like. The seat 14 is bent around the rib 13 to form a contacting portion 15 which is normally spaced slightly away from said rib, which serves to limit the deflection of the seat which may be caused by a sudden increase of pressure in the conduit.

The expansion seats or plates 10 are preferably composed of noncorrosive metal to prevent them adhering to the valves due to corrosion caused by the gases carried in the conduit.

The rings 10 are provided with ports 16 which are threaded at their lower ends for the reception of branch pipes 17 which are connected to a main pipe 18 leading from a fluid pressure device (to be described), and from which fluid is forced under pressure into the rings 10 to expand the seats 14 causing them to contact or seal against the valve plate or goggle 19.

The goggle or valve plate 19 is slidably mounted between the rings 10 and is adapted to be supported in a frame 20.

The lower end of the valve plate 19 has a rack 21 secured thereto which is in mesh with a pinion 22 on a power shaft 23 journaled in bearings 24 on the lower end of the frame 20. The one end of the shaft 23 is mounted in a speed reducer 25 which is provided with a hand operating wheel 26 having a chain 26ª trained around the same for hand operation. The other end of the shaft 23 is provided with a sheave 27, and a counterweight cable 28, having a counterweight 29 secured to its one end, has its other end secured to said sheave and is trained over a second sheave 30, journaled adjacent the top of the frame 20. The counterweight cable 28 will be wrapped on the sheave as the shaft 23 is rotated to lower the valve plate 19, thus raising the counterweight 29, and will be unwrapped to lower the counterweight as the shaft is rotated in the reverse direction to raise the valve plate 19.

The fluid pressure device for forcing fluid under pressure to the rings 10 to expand the seats 14 may be furnished by a tank of compressed air or vapor, a combination compressor and vacuum pump or an accumulator mechanism, which will force liquid under pressure into the rings 10.

The accumulator device will be described in detail, although any other fluid pressure supply means known to the art may be used.

The acumulator comprises a vertical rectangular frame 32 having a base 32ª. The corner members of the frame form girders for an accumulator weight 33 adapted to be raised and lowered by means of a cable 34 having its one end secured to the top of said weight and its other end secured to a sheave or drum 35 mounted on a shaft 36 journaled on the top of said frame and adapted to be rotated through a speed reducing device 37 by means of a hand crank 38.

The lower end of weight 33 is provided with a recess or socket 39 which has an apertured plug 40 threaded therein.

The base 32ª is provided at its center with a raised portion 41 having a compression or collapsible crimped tube or diaphragm 42 secured thereto. The tube 42 extends upwardly and has its upper end secured to a head member 43 which is connected to the weight 33 by a headed bolt or pin 44 which is threaded into the head 43 and has its shank extending loosely through the apertured plug 40. The bolt 44 provides a loose connection between the weight 33 and the head 43, so that the weight may be raised without pulling the tube 42 and head 43.

A guide tube 45 is mounted around the diaphragm or collapsible tube 42 and serves to guide the head 43 and to limit the outward movement of the diaphragm.

The head 43 is provided with an air vent 46 normally closed by a plug 46ª and adapted to be opened only when filling the system with oil or other fluid.

An outlet port 47 communicating with the diaphragm tube 42 is formed in the base 32ª and the fluid pressure supply pipe 18 is threaded in the outer end thereof.

When the system is filled with fluid, the seats 14 will be expanded to seal against the valve plate 19 by lowering the weight 33 so that it will rest upon the head 43, thus compressing the diaphragm tube 42 and forcing the fluid contained therein to rise through the pipe 18 and branches 17 into the pressure rings 10, thus forcing or displacing the seats 14 outwardly against the valve plate 19.

When it is desired to move the valve plate 19 the seats 14 will be contracted by relieving the pressure on the fluid contained therein. This may be done by lifting the weight 33 which will allow the diaphragm tube 42 to return to its normal position and allow the fluid compressed and forced into the rings 10 to flow back into the diaphragm tube. The vacuum and the elasticity of seats 14 will cause them to move back to normal position as the pressure is released and suction action created.

In the modified construction of Figure 6 the pressure ring 10 is omitted, and the rings 4 are provided with a projecting rib or flange 50 of considerable width, on their inner face, and metal expansion seats or rings 51 are welded or otherwise secured to the flange 50. The expansion seats or rings 51 may be crimped as shown in the left hand side of the figure or plain as shown in the right hand side of the figure, as desired, although the crimped ring will be more easily expanded.

The expansion seats or rings 51 are provided with a projecting rib 52 which forms a contact face which engages with the valve plate 19 when the seats are expanded.

The flanges 50 may be provided with a rib 53 to limit deflection of the rings 51 as shown in the left hand side of Figure 6, or have a flat face as shown in the right hand side of Figure 6, as desired.

The fluid for expanding the seats or rings 51 enters the seats or rings through ports 54 formed in the rings 4 and flange 50, and are connected at their lower end with the branches 17 of the fluid pressure supply pipe 18.

The operation of the modified valve seats is the same as that of the preferred construction.

In Figure 7 our invention is shown applied to a gate valve. In this construction the valve is mounted between two sections of pipe 55 and 56, and flanged rings 4ª are secured to each section by welding, riveting, or the like. The valve body 57 is mounted between the rings 4ª and bolted thereto.

Channel shaped pressure rings 10ª are secured to the inner face of the rings 4ª and an expansion plate or seat 14ª is mounted in the channel of the ring 10ª and secured to the side walls thereof by welding, brazing, or the like. The plate or seat 14ª is bent upon itself to form a projecting and contacting portion 15ª which seals against the valve plate or gate 19ª when the seats are expanded.

The rings 10ª are provided with threaded ports through which fluid under pressure is adapted to be forced to expand the seats 14ª and branch pipes 17ª are threaded into the ports and are adapted to be connected to a suitable fluid supply pipe such as pipe 18 leading from the accumulator heretofore described.

The valve plate or gate 19ª has the usual valve stem 59 secured thereto which extends upwardly through the valve bonnet 60 mounted on the rings 4ª and through a suitable stuffing box 61.

The operation of this gate valve is substantially the same as the operation of the goggle valves. When the valve is in closed position the fluid will be forced into the rings 10ª to expand the seats 14ª so that they will seal against the valve plate or gate 19ª. When it is desired to open the valve the fluid pressure will be relieved in the rings 10ª allowing the seats 14ª to contract to normal position and the valve plate or gate 19ª will be moved in the usual manner.

It will also be readily understood that various modifications may be made in the combination of parts and the design of the expanding seats without departing from the spirit of this invention as defined in the appended claims.

We claim:—

1. A sliding valve such as a gate and goggle valve comprising a valve plate, expansible metallic seat members adapted to seal against said plate, and means for forcing fluid under pressure into said seat to expand the same.

2. A sliding valve such as a gate and goggle valve comprising a valve plate, expansible metallic seat members arranged on each side of said plate, and means for forcing fluid into and withdrawing it from said seat members for expanding and contracting said seat members.

3. A sliding valve such as a gate and goggle valve comprising a valve plate, expansible metallic seat members arranged on each side of said plate, said seat members being adapted to be expanded and contracted by forcing fluid into and withdrawing it from said seats.

4. A valve comprising a valve plate, and an expansible metallic seat on each side of said plate member adapted to expand and seal against said plate.

5. A valve comprising a valve plate, and an expansible metallic seat on at least one side of said plate member adapted to expand and seal against said plate, said expansible seat being composed of non-corrosive metal.

6. A valve comprising a valve plate, an expansible non-corrosive metal seat on each side of said plate, and means for forcing fluid under pressure into said seats and for withdrawing said fluid from said seats to respectively expand and contract said seats.

7. The combination with a conduit of a valve adapted to control the flow area of said conduit, said valve comprising a pair of annular ring members spaced apart and secured to said conduit, a valve plate adapted to be moved into open and closed position between said rings, and expansible metallic seats secured to said rings and adapted to form a sealing contact with said plate.

8. The combination with a conduit of a valve adapted to control the flow area of said conduit, said valve comprising a pair of annular ring members spaced apart and secured to said conduit, a valve plate adapted to be moved into open and closed position between said rings, expansible metallic seats secured to said rings adapted to form a sealing contact with said plate, and means for expanding said seats.

9. The combination with a conduit of a valve adapted to control the flow area of said conduit, said valve comprising a pair of annular ring members spaced apart and secured to said conduit, a valve plate adapted to be moved into open and closed position between said rings, hollow expansible non-corrosive metallic seats secured to said rings adapted to form a sealing contact with both side faces of said plate, and an accumulator mechanism for forcing fluid under pressure into said seats and withdrawing said fluid from said seats to respectively expand and contract said seats.

10. The combination with a conduit, of a valve adapted to control the flow area of such conduit, said valve comprising a pair of annular ring members spaced apart and secured to said conduit, a valve plate adapted to be moved into open and closed position between said rings, expansible non-corrosive hollow metallic seats secured to each of said rings, an integral non-collapsible projection on each of said seats adapted to contact with said plate when said seats are expanded to form a seal with both side faces of said plate and means for forcing fluid under pressure between said seats and said rings to expand said seats.

11. The combination with a conduit, of a valve adapted to control the flow area of such conduit, said valve comprising a pair of annular ring members spaced apart and secured to said conduit, a valve plate adapted to be moved into open and closed position between said rings, expansible non-corrosive hollow metallic seats secured to each of said rings, an integral non-collapsible projection on each of said seats adapted to contact with said pate when said seats are expanded to form a seal with both side faces of said plate and an accumulator mechanism for forcing fluid under pressure between said seats and said rings and to withdraw it from between said seats and said rings to, respectively, expand and contract said seats.

In testimony whereof we have hereunto signed our names.

FRANK R. McGEE.
ARTHUR R. SCHULZE.